United States Patent Office 3,374,802
Patented Mar. 26, 1968

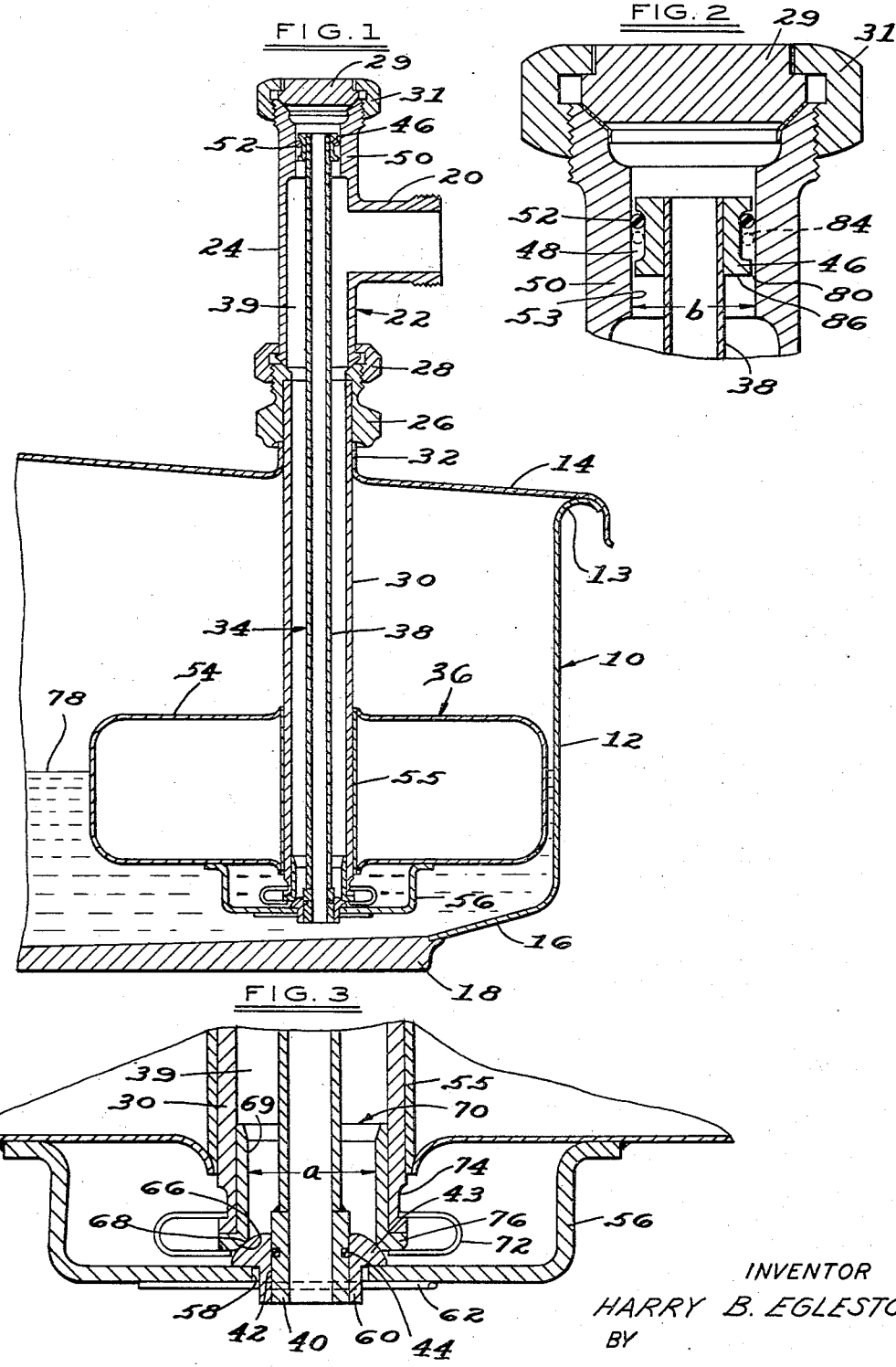

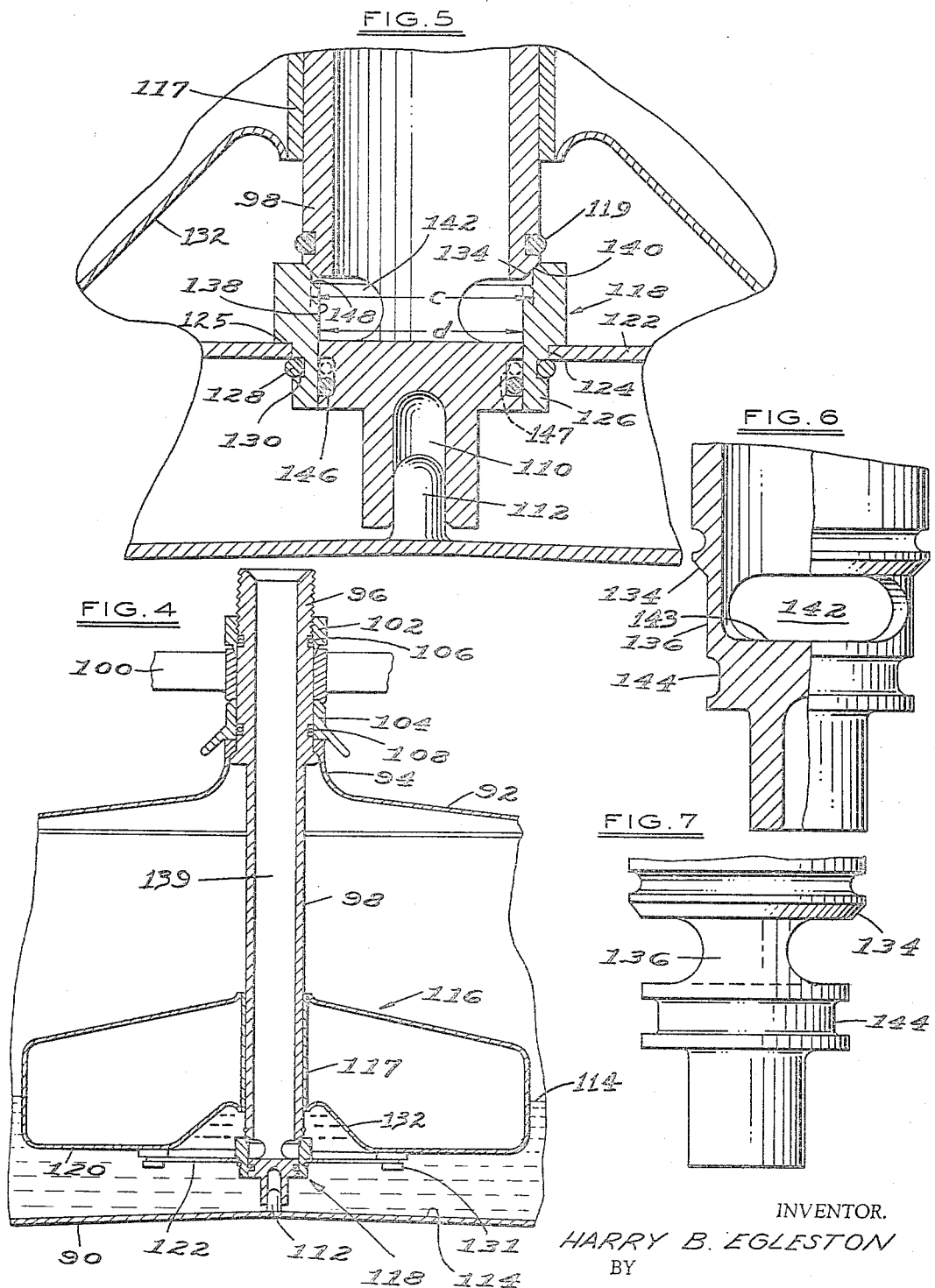

3,374,802
FLOAT VALVE
Harry B. Egleston, Livonia, Mich., assignor to
Ex-Cell-O Corporation
Filed Oct. 21, 1965, Ser. No. 500,404
14 Claims. (Cl. 137—432)

ABSTRACT OF THE DISCLOSURE

This invention relates to a float valve member having an unbalanced pressure force provided by a pressure surface or a differential of two pressure surfaces to assist in opening the valve to pass liquid from a liquid pressure source to a tank unit where a controlled liquid level is to be maintained. The float valve member has a rolling O-ring seal to assist in providing a more sensitive control level system.

---

The present invention relates to float valves for filling machines, and more particularly has reference to pressure unbalanced float valves for more accurately controlling the liquid level in a tank and thereby achieving uniform volume charges of liquid into containers.

The invention is particularly adaptable to reservoir tanks for milk packaging machines or the like, of the type shown generally in U.S. Patent 2,692,717, issued Oct. 26, 1954, to Robert Spurr. In filling milk or the like into containers, the requirement of maintaining a near consistent liquid level is essential to achieve a uniform volume of fill. In order to achieve an unvarying liquid level in the tank, it is one object of the present invention to provide a unique pressure unbalanced valve arrangement to assist the operation of the float in producing a more sensitive response to changes in the level of liquid in the tank.

Another object of the invention is to provide a sensitive float valve that will reduce the amount of vibration caused by the sudden opening and closing of existing float valves.

A further object of the invention is to provide a float valve that will reduce the amount of foaming caused by sudden flow of milk into the tank.

Still another object of the invention is the utilization of a rolling O-ring seal in conjunction with a differential pressure valve to provide a more sensitive float control.

Other objects and many attendant advantages of this invention will be readily appreciated as the same become better understood by reference to the following detailed description when considered in connection with the accompanying drawings in which like reference numerals designate like parts throughout the figures thereof and wherein:

FIG. 1 is a vertical sectional view of a float valve embodying the present invention.

FIG. 2 is an enlarged fragmentary view of the valve portion illustrated in the lower part of FIG. 1.

FIG. 3 is an enlarged fragmentary view of the piston portion illustrated in the upper part of FIG. 1.

FIG. 4 is a vertical sectional view showing a modified form of float valve embodying the principle of the invention.

FIG. 5 is an enlarged fragmentary view of the valve portion illustrated in the lower part of FIG. 4.

FIG. 6 is an enlarged fragmentary side view, partially in section, of the valve seat portion of the valve of FIG. 5.

FIG. 7 is an enlarged front elevation view of the lower portion of the inlet tube shown in FIG. 5.

The float valve of the present invention is particularly adapted for use with milk packaging machines in the types shown in co-pending U.S. patent applications 407,369, filed Oct. 29, 1964, and 448,545, filed Apr. 15, 1965. These applications are assigned to the assignee of the subject application, and the disclosures therefore are incorporated herein by references. It should be understood, however, that there is no intention to limit the invention to use with the specific machine forms disclosed in the aforementioned applications, and that the intention is to cover all modifications, equivalents, alternative constructions and uses falling within the spirit and scope of the invention as expressed in the appended claims.

The apparatus illustrated in FIG. 1 of the drawings, as one embodiment of the present invention, comprises a cylindrical tank, partially shown at 10, which is defined by an annular band of sheet metal forming its side wall 12. This band is formed with a lip 13 at its upper edge to seat a cover member 14 and has an inwardly directed flange 16 sealingly joined at its lower edge to circular bottom plate 18.

The milk is supplied to the tank from any suitable source of supply and enters through the horizontal sleeve 20 of the T member 22 whose vertical sleeve section 24 is seated in the valve adapter 26 by hex union nut 28. Cap member 29 is sealed to the upper portion of T 22 by hex nut 31. The vertical inlet duct 30 is fixably disposed in the flanged opening 32 to receive adapter 26 in its upper end and extends downwardly to an off-center position adjacent the side wall 12 and the bottom of the tank 10. The tank is supplied with milk through the duct 30, while portions of the milk are being measured out and segregated through filler heads suspended from the bottom of the tank as shown in the aforementioned application 407,369. For a complete description of one type of filler head, reference should be had to U.S. Patent 3,002,540, issued Oct. 3, 1961, to Charles Z. Monroe et al.

The inflow of milk and its level in the tank is controlled by the unique piston valve, generally indicated at 34, and float arrangement 36 which will now be described. The valve device comprises a tube 38 concentrically mounted within the supply duct 30 and T 22 to thereby provide an annular passage 39 in communication with sleeve 20. An enlarged cylinder 40 is fixably mounted as an extension on the lower end of the tube 38 for positioning within the bore 42 of valve head 43. Radially compressed O-ring seal 44 is disposed in an annular slot in member 40 to prevent the passage of milk between member 40 and valve head 43. A spool shaped piston 46 is mounted around the upper end of tube 38 and rigidly fixed, as by welding, with respect thereto. The piston 46 is provided with a wide annular groove 48 which faces the reduced piston slide portion 50 of the T 22 and has a rolling O-ring seal of resilient deformable elastomeric material, such as neoprene, disposed in the groove 48 which prevents the passage of the pressurized incoming milk above O-ring 52 and into tube 38. It can be seen from FIG. 2 that the O-ring 52 has a radial thickness greater than the depth of groove 48, while the width of groove 48 is more than twice the radial thickness of O-ring 52. In addition, the outside diameter of piston 46 is less than the diameter of bore 53 to define a narrow annular passage 80 permitting rolling contact between O-ring 52 and the wall of bore 53.

The float unit 36 includes a hollow cylindrical float 54 mounted for vertical sliding movement on duct 30 by means of sleeve 55. The float 54 with its support hub 56 welded on its under surface moves up and down as the milk level changes. The hub 56 has an oversize aperture 58 for the reception of the neck portion 60 of the valve head. The neck 60 is notched for the engagement of the retainer pin 62 to prevent the float unit 36 from slipping off the neck portion of the valve. The pin 62 also engages within a slot in the cylinder 40 of tube 38 so that valve head 43 and tube 38 are retained in fixed relation to each other.

The valve head 43 has its upper surface 66 formed in the arc of a circle, as viewed in vertical section, to have substantially an annular line contact with the conical valve seat surface 68 of the valve orifice 69 extending through insert 70. Clip member 72 fits within recess 74 of insert 70 to hold its flange portion 76 in engagement with the end face of duct 30. It will be noted in FIG. 3 that the aforementioned annular line contact between curved surface 66 and conical surface 68 will be located adjacent the upper edge of surface 68 at its point of minimal diameter. In the particular embodiment shown, the conical surface is formed at approximately 45° of the horizontal.

The operation of the float valve may readily be followed by starting with the valve in closed condition illustrated in FIG. 1. At this time the float unit 36 is in its fully raised position with surfaces 66 and 68 in contact and thereby preventing milk from flowing from duct 30 into the tank 10. The milk level, indicated at 78, is first regulated to achieve the desired liquid level head for a particular run of milk having a given specific gravity to fill a certain container size. During the filling operation, the sleeve 20 and inlet chamber 39 are in communication with a source of milk that has a relatively constant regulated fluid pressure as for example a static elevational head or a pumping head.

It will be noted at this point that the valve has been designed so that the effective area of pressure surface 66 exceeds the effective area of the pressure surface 86 and O-ring 52 of the piston 46. The differential area of the opposed pressure surface can be related to the ratio of their projected areas, which in this particular embodiment are determined from bore diameter $b$, FIG. 2, and diameter $a$ of orifice 69 indicated in FIG. 3. Although the particular ratio will vary, dependent upon the type of liquid, amount of pressure, etc, it has been found that for milk under normal operating pressures, the area of orifice 69 should exceed the area of bore 53 by approximately 10%. The object of this design is to create float valves which will insure sensitive response to changes in the milk level 78. When the liquid level 78 is at its correct height, the upward force exerted by the float 36, compared to the downwardly acting pressure differential, prevails to hold valve head 43 in upper closed contact with the valve seat 68. A slight lowering of liquid level 78 immediately unseats the valve head 43 for the admission of milk.

In this operation the aforementioned pressure differential assists the gravitational force of the float in overcoming the buoyant effect of the milk in the tank. Simultaneously, piston 46 moves downwardly causing O-ring 52 to be mechanically pushed, by engagement with the upper side of groove 48, to a lower position within bore 53.

As the incoming milk replenishes the diminished supply, the float tends to move upwardly to again close the valve opening. As shown by the dashed lines 84 in FIG. 2, the O-ring will momentarily remain in its downward position upon upward movement of piston 46 due to its freedom to roll within groove 48. Subsequently, the pressurized milk in passage 39 will be forced through the annular space 80 into the lower portion of groove 48, thereby acting on the O-ring 52 and rolling it to the upper side of groove 48, as indicated by the solid line position in FIG. 2. The axial piston travel continues until the valve head 43 again seats in contact with surface 68. The buoyant force exerted on the float 36, together with the free rolling space provided within groove 48 during upward piston travel, is sufficient to overcome the differential pressure force which continues to be exerted against the valve seating surface 66.

After the valve 34 closes, the pressurized fluid further exerts force on the rolling O-ring 52 to return it to the upper portion of groove 48, whereupon the cycle will be repeated. The result of applicant's unique valve arrangement is that the milk level 78 remains substantially constant with only slight movement of the float taking place to maintain this level and substantially uniform milk flow passing into the tank. The combination of the pressure differential to assist in opening the valve, together with the rolling O-ring arrangement facilitating upward travel of the piston on valve closing, produces a float valve arrangement that is more sensitive to liquid level variations. As a further consequence, the invention reduces the sudden opening and closing found in existing float valves that cause vibration and jarring of the equipment, together with added maintenance costs.

Referring now to the modification illustrated in FIG. 4, the float valve arrangement comprises an annular tank, partially indicated at 90, whose cover member 92 is provided with a flanged opening 94 located on the vertical center line of the tank. Bushing member 96, forming the upper portion of filler tube 98, is fixably maintained within opening 94 by horizontal support member, partially shown at 100, clamped between lock nut 102 and shield member 104. The members 102 and 104 are suitably sealed to bushing 96 by means of O-ring seals 106 and 108. The lower closed end of tube 98 has a mounting socket 110 (FIG. 5) which seats upon the cylindrical pilot member 112 integral with the floor of the tank, thereby removably securing the tube concentrically with the vertical center line of the tank.

As in the previously described embodiment, the milk level 114 within the tank 90 is controlled by the float unit 116 having a sleeve 117 for mounting the hollow cylindrical float 120 and attached valve 118 on the tube 98. This arrangement allows the unit float 116 to slide vertically on the lower part of tube 98 responsive to the changing liquid level within the tank. The tube 98 is provided on its external surface with a circular channel for seating O-ring 119 which acts as a stop member to limit the downward travel of sleeve 117.

The valve 118 is secured to the float 120 by means of strap member 122 which has a central aperture 124 (FIG. 5) for receiving the reduced neck portion 126 of valve 118. The circular retainer member 128, positioned in annular notch 130, locks the strap 122 in fixed engagement with the shoulder 125 of the valve. The strap 122 is secured to the underside of float 120 by means of outwardly opening slots (not shown) engaging the depending lug members 131. The float 120 is formed with a conical recess 132 concentric with tube 98 for reasons that will be set forth below.

As can be seen best in FIG. 6, the tube 98 exteriorly reduced at its lower closed end to thereby provide a downwardly facing undercut conical seat 134 leading to an annular reduced cylinder portion 136 upon which the valve bore 138 is designed to be slidably received. The upper end of the bore 138 is beveled to provide a conical valve face 140 which beds on the complementary conical valve seat 134 to close the passageway 139 of the tube. The valve bore 138 has a counterbored portion 148 creating a differential dimension between the effective pressure loaded areas presented to the pressurized milk present in the valve bore measured at diameter $c$, and the remaining valve portion indicated by diameter $d$.

The cylinder 136 is provided with horizontally disposed milk discharge slots 142 having a height that extends from the bottom portion 143 of passageway 139 to the lower extremity of seating face 134. As can best be seen in FIG. 7, the slots 142 extend inwardly toward the principal axis whereby each slot intercepts approximately a 120° arcuate portion of the cylinder to facilitate the outward discharge of milk into the tank.

The cylinder 136 is provided on its external surface with an annular wide groove 144 in which is seated O-ring seal 146, of the type shown at 52 in FIG. 2, acting to prevent the leakage of milk into the tank through the lower end of bore 138. As in the case with the previous embodiment, the O-ring 146 has a radial thickness greater than the depth of groove 144, while its cross-sectional dimension is no more than one-half the axial width of groove 144. The clearance between bore diameter *d* and the external diameter of cylinder 136 is such as to permit sealed rolling contact of O-ring 146 during upward movement of valve sleeve 118, as will now be explained.

Again, the operation of the float valve will be described by starting with the valve unit in closed position, illustrated in FIG. 4. As can be seen by the solid line position of O-ring 146 in FIG. 5, the pressure of the milk in passage 139, during the time valve 118 is in closed position, constantly tends to force down the O-ring into the lower portion of groove 144. A slight lowering of the liquid level 114 unseats the valve face 140 from the valve seat 134. As previously indicated, the pressure differential between the areas indicated at *c* and *d* assist the float in opening the valve. The downward movement of valve 118 will be resisted by the increased friction due to the larger area of contact between O-ring 146 and the side wall portion of groove 144.

As the incoming milk supply tends to move float unit 116 upwardly, the space within wide groove 144 will provide minimal upward rolling resistance of the O-ring 146 to enable it to move to a position indicated by the dashed lines 147 in FIG. 5. After seating of valve 118, the pressurized milk in bore 138 will pass into the upper portion of groove 144, thereby acting on O-ring 146 and forcing it to the lower portion of the groove as indicated by the full line position in FIG. 5. Thus, the O-ring will again be seated to be ready for another valve opening and closing cycle.

Again viewing FIG. 4, it will be seen that in this embodiment the milk will enter the tank in an outward direction as contrasted with the downward flow pattern in the float valve of FIGS. 1–3. By this design an even greater reduction in turbulence and resulting foaming can be achieved by the resulting laminar flow adjacent the surface of the liquid in the tank. It will be seen that by providing the recess 132 in float 120, the outlets 142 are able to be located in proximity to the upper level of the milk. As the milk along the floor of the tank is fed directly into the filler heads, it is important that foaming be eliminated in this area to achieve a more accurate fill into the container.

It should be pointed out that while the pressure differential was created by counterbore 148 in the valve of FIGS. 4–7, various other methods could be employed, such as providing an arcuate surface on the valve face to increase the effective diameter at this portion of the valve. In cases where it is desired to increase or decrease the pressure differential, an appropriate valve sleeve 118 can be readily substituted. It will be noted that in the embodiment of FIGS. 1–3, the insert member 70 need only be changed to vary the pressure differential of the valve.

I claim:

1. A pressure unbalanced float valve for controlling the liquid level in a tank from a source of relatively constant pressure, comprising:
   (a) a vertical stationary inlet tube within said tank providing a longitudinally extending passageway, and inlet means communicating with said passageway for admitting said pressurized liquid,
   (b) outlet means in communication with said passageway for supplying liquid to said tank,
   (c) a float element slidably mounted on said vertical stationary inlet tube responsive to the liquid level in said tank,
   (d) valve means secured to said float element and having an upwardly directed valve face,
   (e) said float element operation to move said valve means vertically to thereby open and close said outlet means,
   (f) said valve means having at least one pressure loaded surface exposed to said incoming liquid to establish a downwardly acting pressure to assist said float element in opening said outlet means, and
   (g) said valve means having an annular wide groove and cooperating resilient sealing O-ring seated therein operative to assist said float element in closing said outlet means.

2. In a float valve in accordance with claim 1, wherein the cross-sectional dimension of said O-ring is no more than one-half the axial width of said groove.

3. In a float valve in accordance with claim 1, wherein said valve means has upward and downward pressure loaded surfaces with said downward surface having a larger area than said upward surface to provide an effective pressure differential area to assist in opening said outlet means.

4. In a float valve in accordance with claim 3, wherein the effective differential area of said valve means establishes a downwardly acting pressure increase of approximately 10% of the pressure of said pressure liquid.

5. In a float valve in accordance with claim 1, wherein the effective area of said pressure loaded surface establishes a downwardly acting pressure increase of approximately 10% of the pressure of said pressure liquid.

6. A pressure unbalanced float valve for controlling the liquid level in a tank from a source of relatively constant regulated pressure, comprising,
   (a) a vertical tube for admitting said pressurized liquid into said tank, having an inlet and a downwardly opening outlet comprising a valve seat,
   (b) a valve stem positioned within said tube,
   (c) a valve head having an upwardly directed face at the lower end of said valve stem and vertically movable with said stem to bed on said valve seat,
   (d) said stem extending axially of said valve head and having piston means disposed about said stem at its upper end, said piston means having its downwardly directed surface exposed to said pressurized liquid,
   (e) a float element secured to said valve and movable along said tube in response to changes in the liquid level in said tank,
   (f) said piston means having an annular wide groove formed in its external surface and a cooperating resilient sealing O-ring seated therein operative to assist said float element in closing said outlet,
   (g) the effective area of said valve force exceeding the opposed effective area of said piston means to assist said float element in opening said outlet.

7. In a float valve in accordance with claim 6 wherein the cross-sectional dimension of said O-ring is no more than one-half the axial width of said groove.

8. In a float valve in accordance with claim 6 wherein the effective differential area of said valve face and said piston means establish a pressure differential of approximately 10%.

9. In a float valve in accordance with claim 6 wherein said differential pressure area can be changed by means of a cylindrical valve seat insert removably positioned within said outlet.

10. A pressure unbalanced float valve for controlling the liquid level in a tank from a source of relatively constant regulated pressure, comprising,
   (a) a vertical closed end tube for admitting said pressurized liquid into said tank having an inlet substantially adjacent its upper end,
   (b) said closed end being externally reduced in diameter to provide an undercut conical valve seat,
   (c) outlet means in said reduced end below said valve seat,
   (d) a sleeve valve slidably mounted on said reduced portion having an upwardly directed conical valve face adapted to bed on said valve seat,
   (e) a float element secured to said sleeve valve and slidably mounted on said vertical closed end tube responsive to the liquid level within said tank, (f) said sleeve valve having a pressure loaded surface exposed to said pressurized liquid to establish a downwardly acting pressure to assist said float element in opening said outlet means, and (g) said reduced portion having an annular wide groove and a cooperating resilient sealing O-ring seated therein operative with said sleeve valve to sealably close said outlet means end from passage of said pressurized liquid.

11. In a float valve in accordance with claim 10 wherein the cross-sectional dimension of said O-ring is no more than one-half the axial height of said groove.

12. In a float valve in accordance with claim 10 wherein the effective area of said pressure loaded surface establishes a downwardly acting pressure increase of approximately 10% of the pressure of said pressure liquid.

13. In a float valve in accordance with claim 10 wherein said downwardly acting pressure is attained by counterboring the upper end of said sleeve valve to thereby reduce the area of contact between said valve face and said valve seat.

14. In a float valve in accordance with claim 10 wherein, (a) said sleeve valve having a sleeve member slidably mounted on said tube, and (b) said float element secured to said sleeve member and having a central recessed portion on its lower surface whereby said outlet means are located within said recess.

References Cited

UNITED STATES PATENTS

| | | | |
|---|---|---|---|
| 1,522,982 | 1/1925 | Strandt | 137—432 |
| 2,646,819 | 7/1953 | Lippold | 137—432 |
| 2,679,859 | 6/1954 | Kummer | 137—432 |

ALAN COHAN, *Primary Examiner.*

D. R. MATTHEWS, *Assistant Examiner.*